US007945533B2

(12) United States Patent
Krishnaprasad et al.

(10) Patent No.: US 7,945,533 B2
(45) Date of Patent: May 17, 2011

(54) INDEX REPLICATION USING CRAWL MODIFICATION INFORMATION

(75) Inventors: Muralidhar Krishnaprasad, Fremont, CA (US); Chi-Ming Yang, Sunnyvale, CA (US); Joaquin A. Delgado, Santa Clara, CA (US); Meeten Bhavsar, Emerald Hills, CA (US); Thomas H. Chang, Redwood Shores, CA (US)

(73) Assignee: Oracle International Corp., Redwood Shores, CA (US)

( * ) Notice: Subject to any disclaimer, the term of this patent is extended or adjusted under 35 U.S.C. 154(b) by 722 days.

(21) Appl. No.: 11/710,100

(22) Filed: Feb. 23, 2007

(65) Prior Publication Data

US 2007/0208716 A1 Sep. 6, 2007

Related U.S. Application Data

(60) Provisional application No. 60/777,988, filed on Mar. 1, 2006, provisional application No. 60/853,487, filed on Oct. 20, 2006.

(51) Int. Cl.
G06F 7/00 (2006.01)
G06F 15/16 (2006.01)

(52) U.S. Cl. ........ 707/637; 707/638; 707/610; 707/611; 707/615; 707/620; 709/248

(58) Field of Classification Search .............. 707/3, 610, 707/611, 620, 637, 638, 615; 709/248
See application file for complete search history.

(56) References Cited

U.S. PATENT DOCUMENTS

| 6,631,369 | B1 * | 10/2003 | Meyerzon et al. ........... 707/4 |
| 6,983,282 | B2 * | 1/2006 | Stern et al. .................. 707/805 |
| 7,200,592 | B2 * | 4/2007 | Goodwin et al. ............ 706/46 |
| 7,472,113 | B1 * | 12/2008 | Watson et al. .............. 707/3 |
| 2005/0015466 | A1 * | 1/2005 | Tripp ........................ 709/219 |
| 2005/0216524 | A1 * | 9/2005 | Gomes et al. ............... 707/201 |
| 2007/0150515 | A1 * | 6/2007 | Brave et al. ................ 707/104.1 |

OTHER PUBLICATIONS

"Oracle Secure Enterprise Search", Administrator's Guide, 10g Release 1 (10.1.6) B 19002-02, Mar. 2006.*
Oracle Corporation, Oracle Secure Enterprise Search 10g, One Search Across Your Enterprise Repositories, Mar. 2006, pp. 1-10, Oracle Corp., Redwood Shores, CA, US.
Oracle Corporation, Oracle Secure Enterprise Search 10g, An Oracle Technical White Paper, Mar. 2006, pp. 1-20, Oracle Corp., Redwood Shores, CA, US.
Oracle Corporation, Oracle Database 10g, Oracle High Availability, Sep. 2006, pp. 1-12, Oracle Corp., Redwood Shores, CA, US.

* cited by examiner

*Primary Examiner* — Etienne P LeRoux
*Assistant Examiner* — Cindy Nguyen
(74) *Attorney, Agent, or Firm* — Kraguljac & Kalnay, LLC (57) ABSTRACT

Systems, methodologies, media, and other embodiments associated with index replication using crawl modification information are described. One exemplary system embodiment includes an enterprise search system comprising a target search system comprising an index logic that uses modified crawl information related to items associated with sources to maintain an index that supports searching of the items; and, a crawl search system comprising a pipeline processor configured to receive modified crawl information related to the items and to propagate the modified crawl information to the target system.

21 Claims, 8 Drawing Sheets

INDEX REPLICATION USING CRAWL MODIFICATION INFORMATION

CROSS REFERENCE TO RELATED APPLICATIONS

This application claims the benefit of U.S. Provisional Patent Application Ser. No. 60/777,988 filed Mar. 1, 2006, titled "Systems and Methods For Searching".

This application also claims the benefit of U.S. Provisional Patent Application Ser. No. 60/853,487 filed Oct. 20, 2006, titled "Index Replication Using Crawl Modification Information", inventors Krishnaprasad et at.

BACKGROUND

An enterprise may have a variety of data having a variety of formats. This disparate data may be stored in a number of locations. For example, emails may be stored in email servers and on user desktop systems. Similarly, calendar information may be stored in a calendar server and on user desktop systems. Items (e.g., word processing files, spreadsheets, presentations, web pages) may be stored in different locations distributed throughout the enterprise. An index/search system can facilitate locating and retrieving relevant items of the enterprise.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems, methods, computer-readable media, software and other embodiments are described herein that relate to replication and/or high availability of search information. In one embodiment, a crawl search system can crawl items, identify modification(s) to the crawled items and provide information regarding the modification(s) to one or more target search systems. The target search system(s) can use the information regarding the modification(s) to independently update their associated index. In this manner, the target search system(s) do not separately crawl the items—the target search system(s) process the information regarding modification(s) received from the crawl search system.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly storing and providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored on a computer-readable medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software stored on a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Query", as used herein, refers to a semantic construction that facilitates gathering and processing information. A query might be formulated in a database query language like structured query language (SQL) or object query language (OQL). A query might be implemented in computer code (e.g., C#, C++, JavaScript) that can be employed to gather information from various data stores and/or information sources.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Information provided by a crawling system may be indexed, for example, by a search system to which the crawling system provides the information. Queries to locate relevant documents may thus interact with the index rather than trying to perform their own search.

Figure 1:
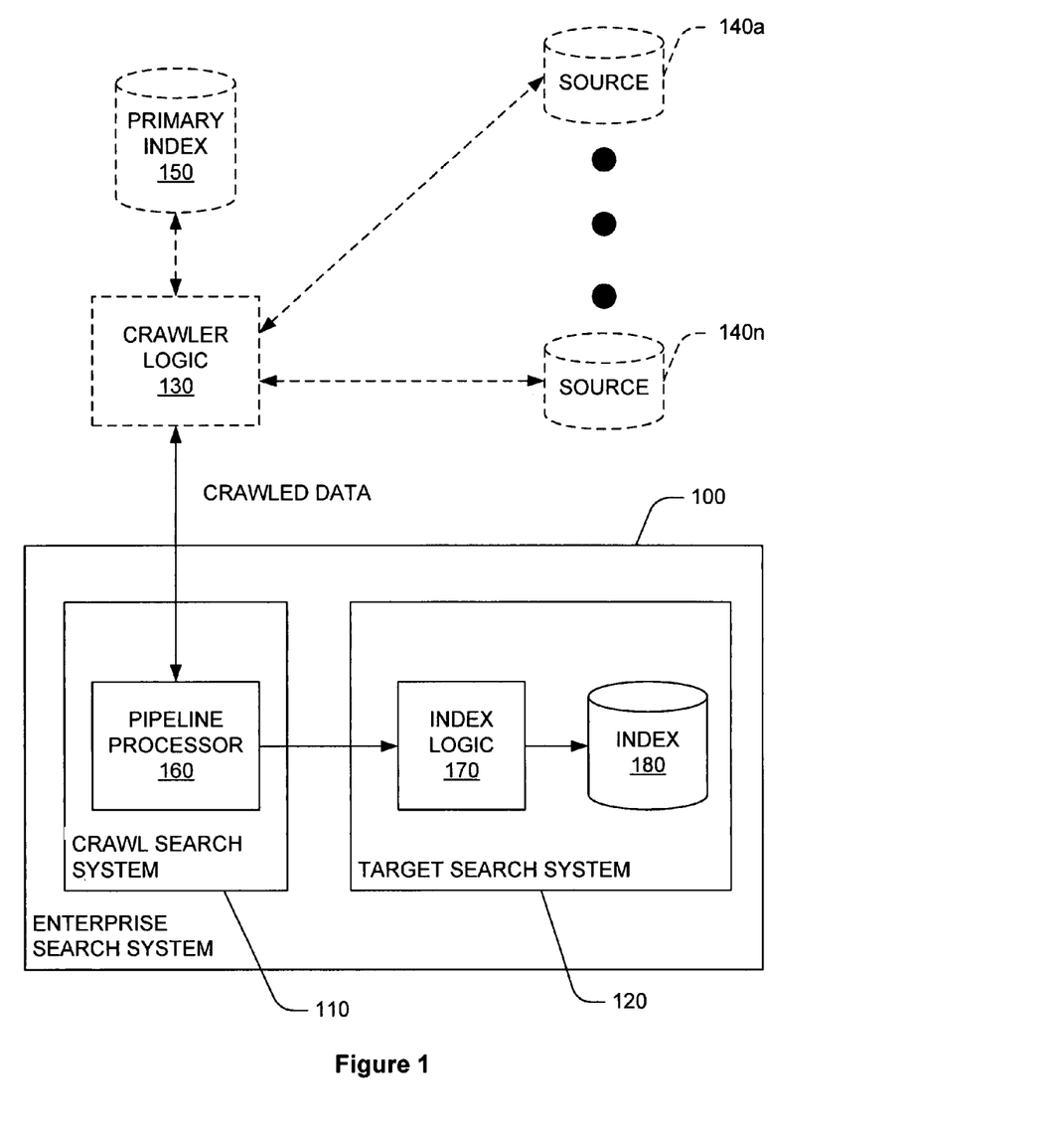
FIG. 1 illustrates an example enterprise search system.

FIG. 1 illustrates an enterprise search system 100 that can be employed, for example, to facilitate replication and/or high availability of enterprise search information. The enterprise search system 100 includes a crawl search system 110 and one or more target search system(s) 120 that replicate a primary index 150. In one embodiment, the target search system (s) 120 can replicate the primary index 150 without re-crawling sources.

In order to achieve replication of index information to facilitate high availability of search information, logically and/or physically separate indexes can be maintained, for example, a primary index and one or more replicated indexes. Conventionally, each search system separately crawled sources to obtain information regarding items (e.g., documents, files, web pages, emails, spread sheets, databases etc.) of an enterprise. The search system performed additional annotations such as metadata extraction and/or filtering.

The information obtained was then indexed for use during search. For example, an index can organize content, metadata, security information, and so on to support queries that search for documents and/or content. Rather than having to search the entire enterprise with respect to each query, relevant results can be identified through the index.

Thus, with conventional systems, redundant information was obtained, annotated, indexed and maintained in order to facilitate high availability of search information. In the event that a primary index failed, one or more redundant indexes were available to facilitate searching. However, the redundant crawling of sources by each search system can be unduly burdensome for the sources, for example, for causing an undue load on the sources. Additionally, maintaining synchronization between the conventional search systems can be problematic.

With the enterprise search system 100, a crawler logic 130 can crawl items associated with sources 140a-140n (collectively "the sources 140") and identify modification(s) to items associated with the sources 140. A source can include a datastore/repository, a database, a website, or other type of information source that can be crawled. The crawler logic 130 can store information regarding modification(s) to the items associated with the sources 140 in the primary index 150. While depicted in FIG. 1 as physically separate from the crawl search system 110, in one example, the crawler logic 130 is a component of the crawl search system 110.

For example, the crawler logic 130 can be configured to access items stored on different sources 140a-140n belonging to an enterprise. The items may have different document types, different security settings, and so on. The crawler logic 130 can detect whether an item or information associated with a item has changed since a previous crawl.

For example, crawler logic 130 can identify changes to a content, a document metadata, and a document security information (e.g., access control list ACL). Additionally, the crawler logic 130 can identify changes to an Access Control List Identifier (ACL-ID), an owner globally unique identifier (GUID) and so on. The crawler logic 130 can selectively mark a document for re-indexing if there has been a change. The indexing may include organizing content and accessible user information (e.g., security settings), which can then be used to support secure queries.

Additionally, the crawler logic 130 can provide information regarding the modification(s) to the sources 140 to a pipeline processor 160 of the crawl search system 110. The pipeline processor 160 can provide (e.g., propagate) information regarding the modification(s) to the sources 140 to one or more target search systems 120.

The target search systems 120 can include an index logic 170 that receives the information regarding the modification(s) from the pipeline processor 160. Accordingly, the target search systems 120 do not separately crawl the sources 140— the target search systems 120 process the information regarding modification(s) received from the crawl search system 110.

The index logic 170 can then independently update an index 180 associated with the particular target search system 120. Similar to the primary index 150, the index 180 of the target search system 120 can organize content, metadata, security information, and so on to support queries that search for documents and/or content. The primary index 150 and the index 180 can employ similar and/or different storage mechanisms (e.g., protocols).

In one example, the crawler logic 130 can include a set of crawlers, which can touch (e.g., locate, examine, retrieve from) many sources. Further, the crawler logic 130 can retrieve data (e.g., content), metadata (e.g., URL, a content type, a crawl depth, a language code, an attribute count, an attribute list, an owner GUID, a source hierarchy, title, type, creation date, modification date and so on), and/or security information (e.g., access control list (ACL)) associated with an item. This information can be normalized so that similar information concerning an email, a calendar entry, a web page, and so on, can be processed in a consistent and/or uniform manner. Normalized data may include, for example, a first paragraph of content, a keyword(s) extracted from content, author information, creation information, modification information, security information, and so on.

Figure 2:
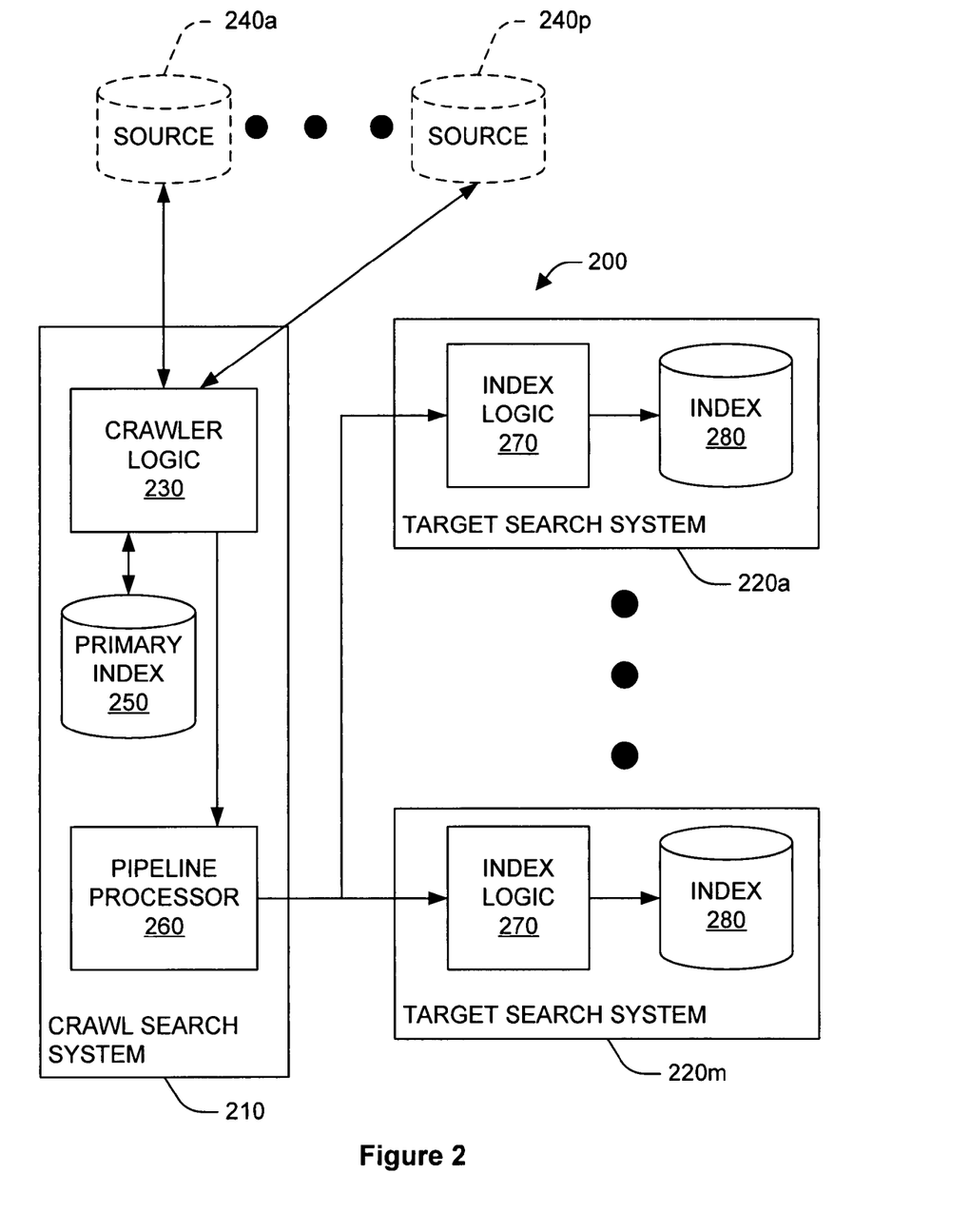
FIG. 2 illustrates another example enterprise search system.

FIG. 2 illustrates an enterprise search system 200 that can be employed, for example, to facilitate replication and/or high availability of enterprise search information. The enterprise search system 200 includes a crawl search system 210 and a plurality of target search systems 220a-220m. As discussed in greater detail below, individually and/or collectively, the target search systems 220 can replicate a primary index 250 without re-crawling sources 240.

In one example, the enterprise search system 200 includes a crawler logic 230 that can crawl items associated with sources 240a-240p (collectively "the sources 240") and identify modification(s) to items associated with the sources 240. The sources 240 represent similar types of sources as the sources 140 from FIG. 1. The crawler logic 230 can store information regarding modification(s) to the items associated with the sources 240 in the primary index 250. In another example, the crawler logic 230 is physically and/or logically separate from the crawl search system 210.

The crawler logic 130 can be configured to access items stored on different sources 240 belonging to an enterprise. The items can have different document types, different security settings, and so on. The crawler logic 230 can detect whether an item or information associated with a item has changed since a previous crawl.

The crawler logic 230 can provide information regarding the modification(s) to the sources 240 to a pipeline processor 260 of the crawl search system 210. The pipeline processor 260 can provide (e.g., propagate) information regarding the modification(s) to the sources 240 to one or more target search systems 220. In this example, the target search systems 220 collectively can replicate the primary index 250 without re-crawling the sources 240. Thus, each target search system 220a-220m can obtain crawl information without its own dedicated crawler that would otherwise duplicate the crawls of other dedicated crawlers.

In one example, each of the target search systems 220 receives substantially all of the modification information from the pipeline processor 260. Thus, each target search system 200 can independently serve as a backup to the crawl search system 210.

In another example, indexing provided by the target search systems 220 are partitioned, for example, temporally, by logical grouping (e.g., author, enterprise business group etc.), by type of item (e.g., word processing, email etc.), and the like. The pipeline processor 260 can then provide modification information only to the appropriate target search system(s) 220. Alternatively, the pipeline processor 260 can broadcast substantially all of the modification information to each of the target search systems 220 with only the appropriate individual target search system(s) 220 processing the modification information.

For example, a first target search system 220a can be dedicated to indexing word processing items and a second target search system 220m can be dedicated to indexing spreadsheets. When the pipeline processor 260 receives modification information regarding a word process item, that information can be forwarded to the first target search system 220a and not to the second target search system 220m. Alternatively, the modification information can be sent to some or all the target search systems 220a-m with the appropriate target search system 220 processing the modification information that is relevant to it (e.g., the information is filtered by the receiving target search system).

In another example, items associated with a particular source can be provided to a particular target search system 220a. In yet another example, items associated with a particular entity (e.g., author, enterprise division etc.) can be provided to a particular target search system 220a.

The target search systems 220 can include an index logic 270 that receives the information regarding the modification(s) from the pipeline processor 260. Accordingly, the target search systems 220 do not separately crawl the sources 240 but rather share the crawled information and process the modifications received from the crawl search system 210. Thus, redundant crawling of sources 240 can be reduced or eliminated by sharing/distributing crawled information between the target search systems 220a-220m.

The index logic 270 can then independently update an index 280 associated with the particular target search system 220. The index 280 of the target search system 220 can organize content, metadata, security information, and so on to support queries that search for documents and/or content.

Figure 3:
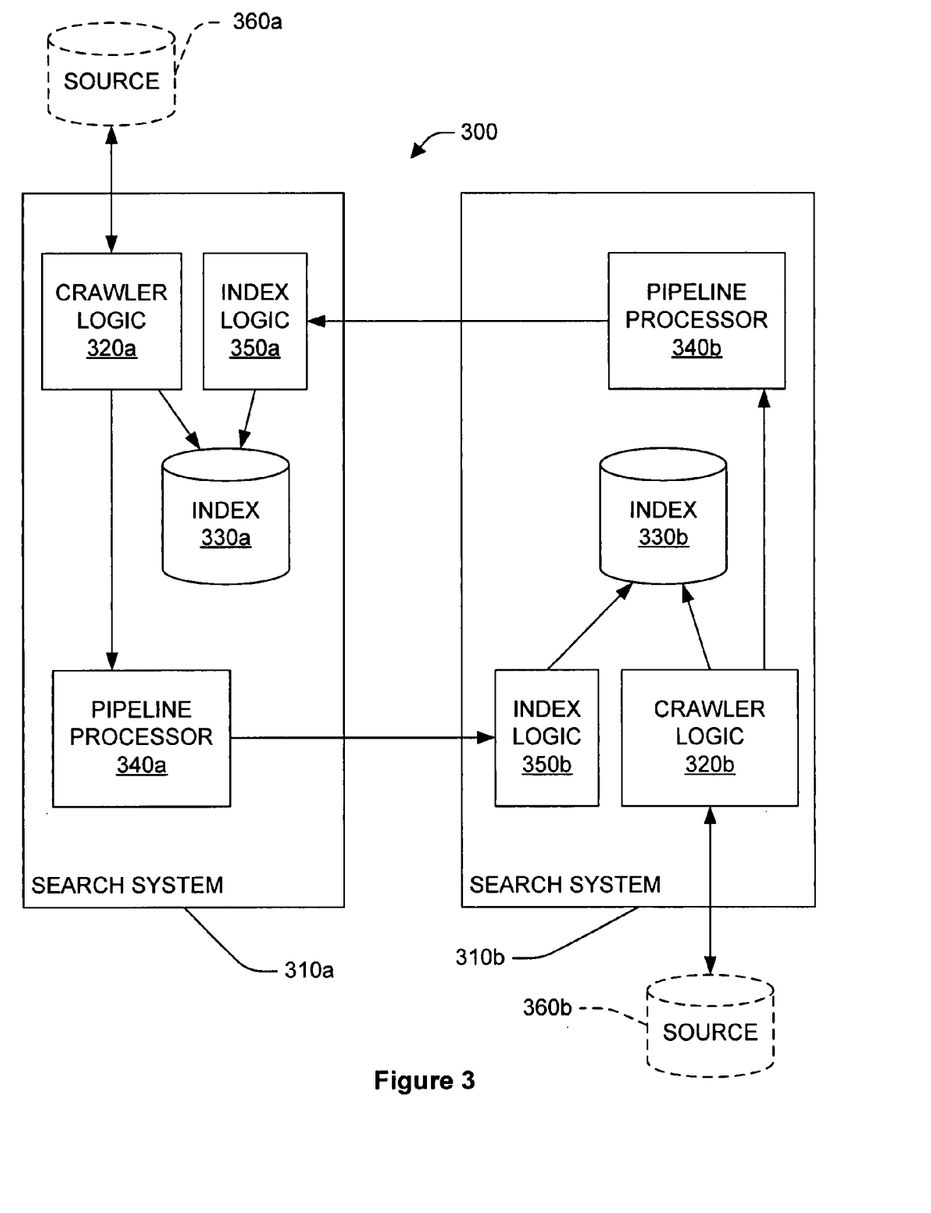
FIG. 3 illustrates an example distributed enterprise crawl system.

FIG. 3 illustrates a distributed enterprise crawl system 300 that can be employed, for example, to facilitate replication and/or high availability of enterprise search information. The enterprise search system 300 includes a first search system 310a and a second search system 310b.

Each search system 310 includes a crawler logic 320, an index 330, a pipeline processor 340 and an index logic 350. The crawler logic 320 can detect whether an item or information associated with a item has changed since a previous crawl. The crawler logic 320 can be configured to access items stored in particular source(s) 360 (e.g. 360a, 360b ...) and/or portions of source(s) 360 (e.g. 360, 360b ...) belonging to an enterprise. For example, the first search system 310a can be configured to crawl a first source 360a while a second search system 310b can be configured to crawl a second source 360b.

The crawler logic 320a of the first search system 310a can provide information regarding the modification(s) to the first source 360a to the pipeline processor 340a of the first search system 320a. The pipeline processor 340a of the first search system 320a can provide (e.g., propagate) information regarding the modification(s) to the first source 360a to the index logic 350b of the second search system 310b. The index logic 350b of the second search system 310b can then independently update the index 330b of the second search system 310b.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 4:
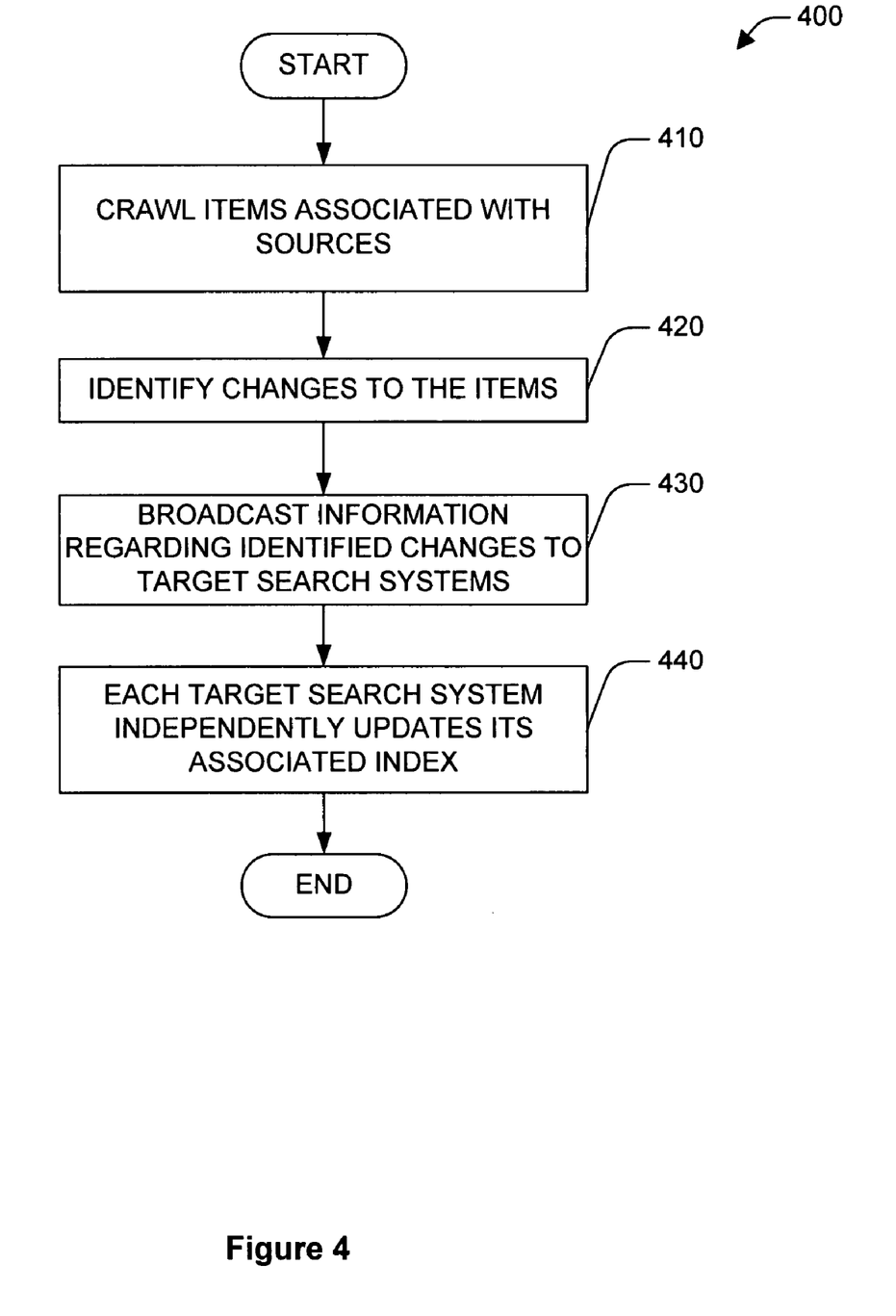
FIG. 4 illustrates an example method for replicating search information.

Illustrated in FIG. 4 is an example methodology 400 for replicating search information. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagram of FIG. 4, as well as the other illustrated diagrams, are not intended to limit the implementation of the described examples. Rather, the diagrams illustrate functional information one skilled in the art could use to design/fabricate circuits, generate software, or use a combination of hardware and software to perform the illustrated processing.

It will be appreciated that electronic and software applications may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. They may also be implemented using various programming approaches such as machine language, procedural, object oriented and/or artificial intelligence techniques. A method can be implemented by processor executable instructions provided by a computer-readable medium that when the instructions are executed cause a computing system to perform the method. The foregoing applies to all methodologies described herein.

FIG. 4 illustrates a method 400 for replicating search information. At 410, items associated with sources are crawled, for example, by a crawler logic 130, 230, 320. At 420, changes to the items are identified (e.g., by the crawler logic 130, 230, 320).

At 430, information regarding identified changes is broadcast to one or more target search systems (e.g., target search system 120, 220), for example, by a pipeline processor 160, 260. At 440, each target search system independently updates its associated index and the method 400 ends.

While FIG. 4 illustrates various actions occurring in serial, it is to be appreciated that various actions illustrated in FIG. 4 could occur substantially in parallel. By way of illustration, a first process could crawl items associated with sources. Similarly, a second process could identify changes to the items, while a third process could broadcast information regarding identified changes to target search systems. While three processes are described, it is to be appreciated that a greater and/or lesser number of processes could be employed and that lightweight processes, regular processes, threads, and other approaches could be employed.

Figure 5:
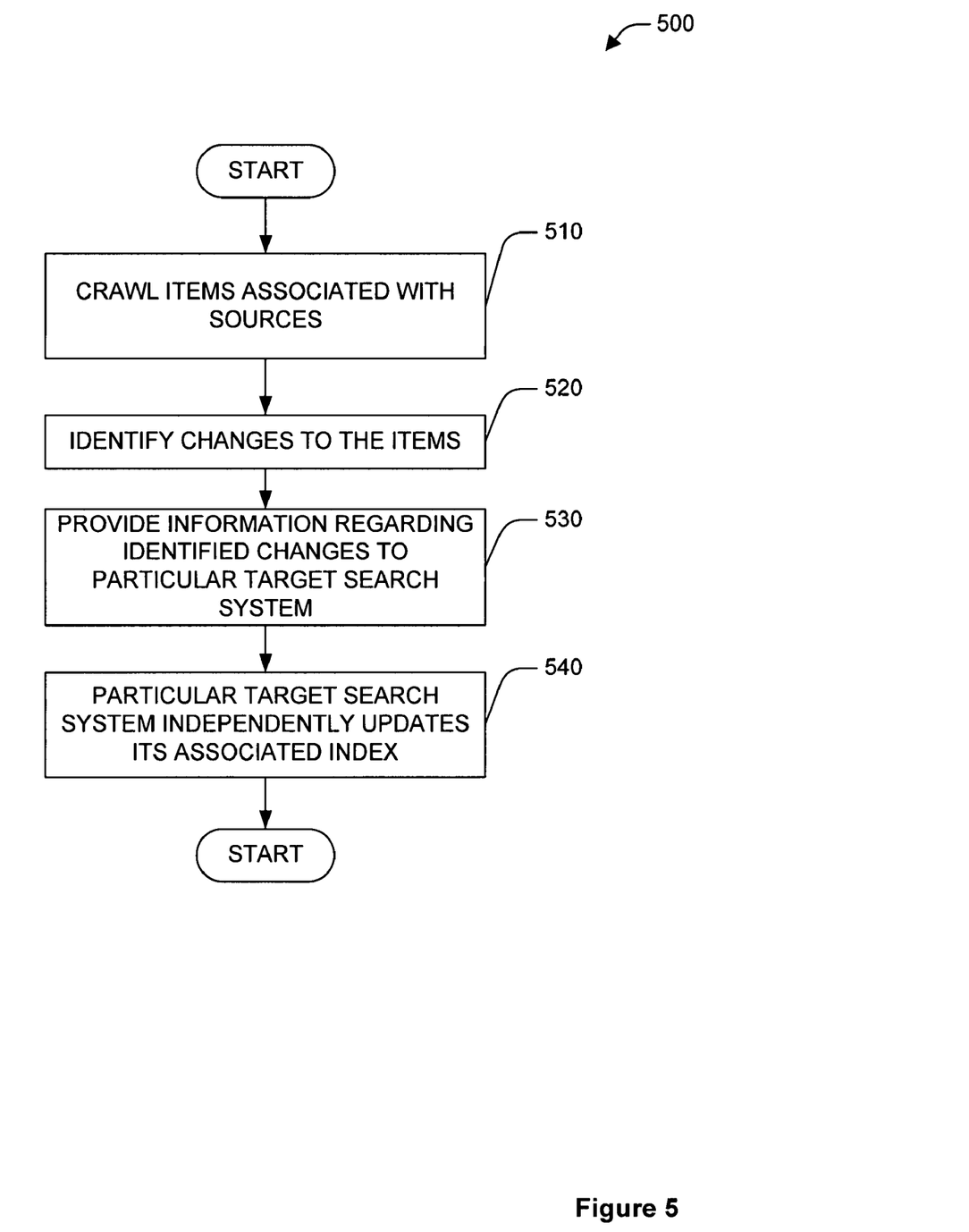
FIG. 5 illustrates an example method for replicating search information.

FIG. 5 illustrates a method 500 for replicating search information. At 510, items associated with sources are crawled. At 520, changes to the items are identified.

At 520, information regarding identified changes is provided to particular target search system(s). At 530, the particular target search system(s) independently update their associated indexes, and, the method 500 ends.

Figure 6:
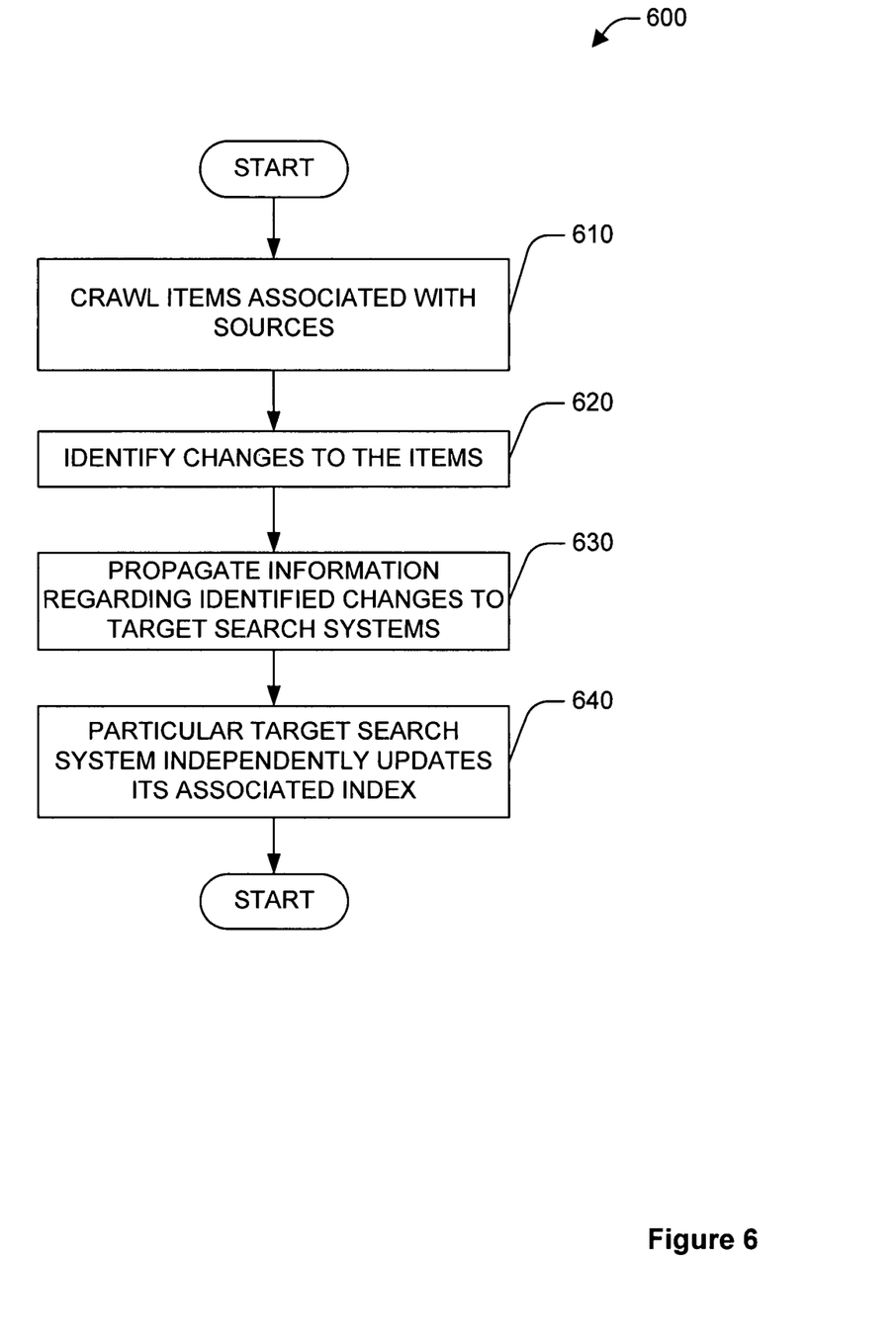
FIG. 6 illustrate an example method for replicating search information.

FIG. 6 illustrates a method 600 for replicating search information. At 610, items associated with sources are crawled. At 620, changes to the items are identified.

At 630, information regarding identified changes is propagated to target search systems (e.g., substantially all target search systems). At 640, particular target search system(s) independently update their associated indexes, and, the method 600 ends.

Figure 7:
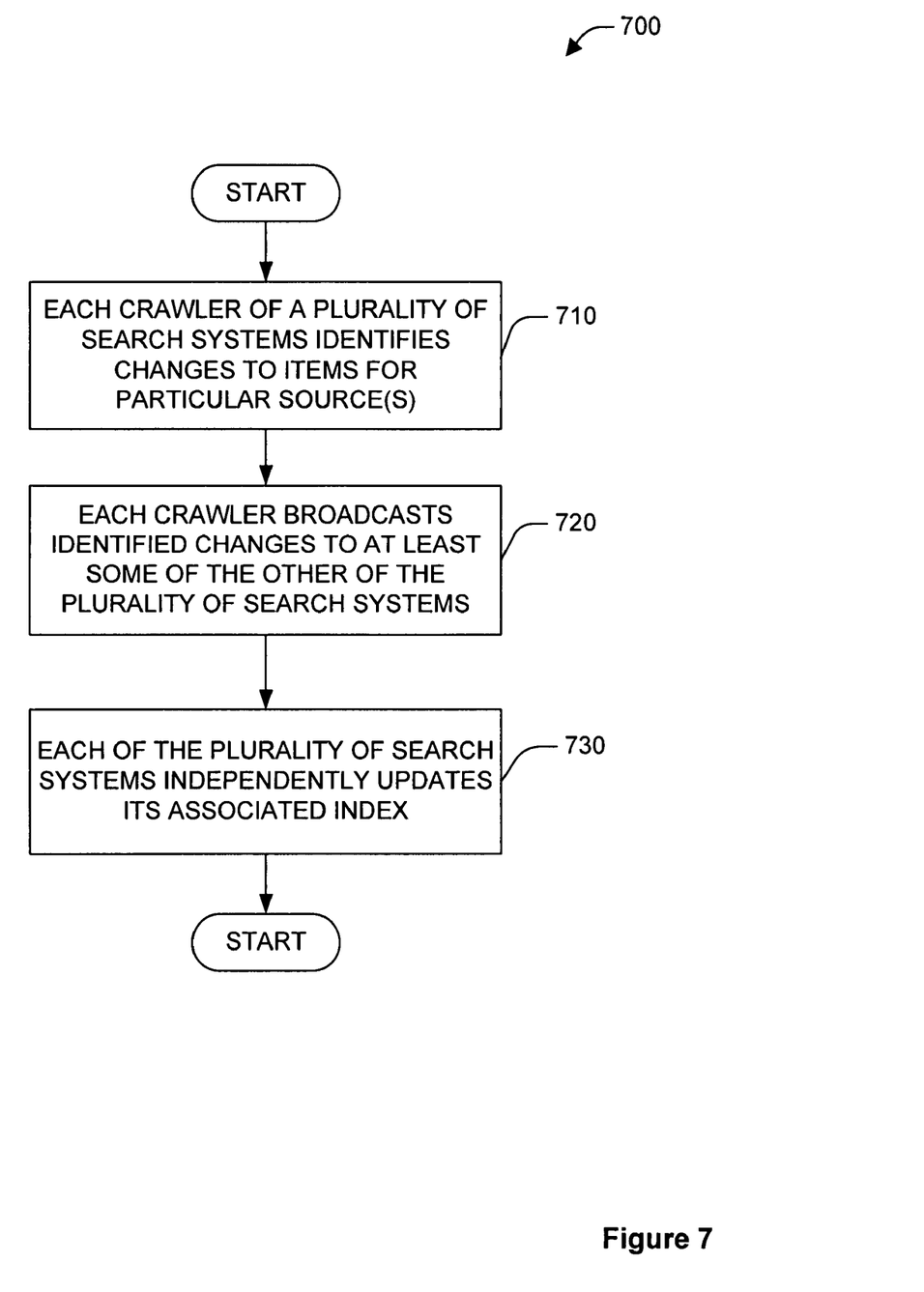
FIG. 7 illustrates an example method for replicating search information in a distributed crawl environment.

FIG. 7 illustrates a method 700 for replicating search information in a distributed crawl environment. At 710, each crawler of a plurality of search systems identifies changes to items for particular source(s) (e.g. sources that each crawler is assigned to search or is responsible for searching). At 720, each crawler broadcasts identified changes to at least some of the other plurality of search systems. At 730, each search system can collect the crawled information from the different crawlers and independently update its associated index for the plurality of sources, and, the method 700 ends.

In another embodiment, crawling assignments for crawling a plurality of information sources can be distributed between the plurality of crawlers. Each of the crawlers can then crawl their assigned sources and identify changes that have occurred to items within their assigned information sources. The identified changes are broadcasted/provided by the crawlers to the plurality of search systems. With the collected changes, each search system can independently update an index to the plurality of information sources using the identified changes.

In one example, methodologies are implemented as processor executable instructions and/or operations stored on a computer-readable medium. Thus, in one example, a computer-readable medium may store processor executable instructions operable to perform a method 400, 500, 600 for replicating search information. While the above method is described being stored on a computer-readable medium, it is to be appreciated that other example methods described herein can also be stored on a computer-readable medium.

Figure 8:
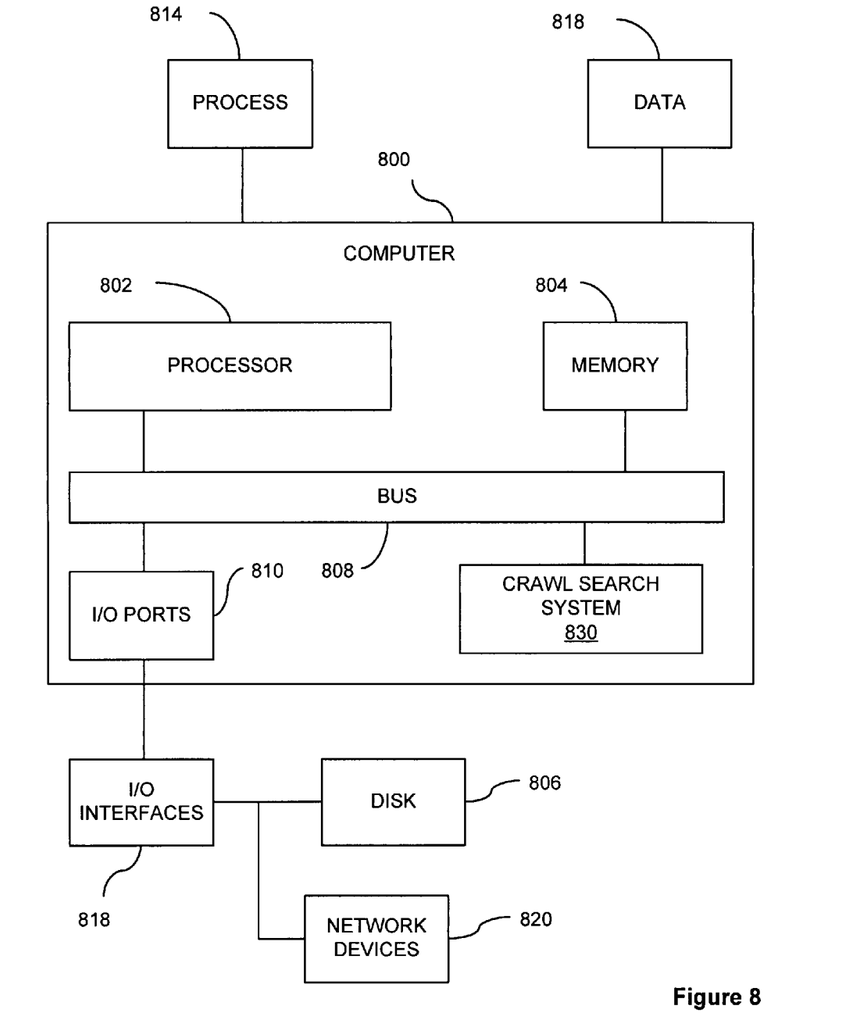
FIG. 8 illustrates an example computing environment in which example systems and methods illustrated herein can operate.

FIG. 8 illustrates an example computing device in which example systems and methods described herein, and equivalents, can operate. The example computing device may be a computer 800 that includes a processor 802, a memory 804, and input/output ports 810 operably connected by a bus 808. In one example, the computer 800 may include a crawl search system 830 configured to facilitate propagation of modified crawl information to target search system(s). The crawl search system 830 can be implemented similar to the crawl search system 110, 210 described in FIGS. 1 and 2, respectively, and/or the other systems and methods described herein.

Generally describing an example configuration of the computer 800, the processor 802 can be a variety of various processors including dual microprocessor and other multiprocessor architectures. The memory 804 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 can include, but is not limited to, devices like a magnetic disk drive, a solid state disk drive, a floppy disk drive, a tape drive, a Zip drive, a flash memory card, and/or a memory stick. Furthermore, the disk 806 can include optical drives like a CD-ROM, a CD recordable drive (CD-R drive), a CD rewriteable drive (CD-RW drive), and/or a digital video ROM drive (DVD ROM). The memory 804 can store processes 814 and/or data 816, for example. The disk 806 and/or memory 804 can store an operating system that controls and allocates resources of the computer 800.

The bus 808 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 800 may interact with input/output devices via i/o interfaces 818 and input/output ports 810. Input/output devices can include, but are not limited to, a keyboard, a microphone, a pointing and selection device, cameras, video cards, displays, disk 806, network devices 820, and the like. The input/output ports 810 can include but are not limited to, serial ports, parallel ports, and USB ports.

The computer 800 can operate in a network environment and thus may be connected to network devices 820 via the i/o devices 818, and/or the i/o ports 810. Through the network devices 820, the computer 800 may interact with a network. Through the network, the computer 800 may be logically connected to remote computers. The networks with which the computer 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 820 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:
1. An enterprise search system, comprising:
 a target search system comprising an index logic, stored in a non-transitory computer-readable medium, that is configured to receive modified crawl information from a crawl search system and to use the modified crawl information to maintain an index that supports searching of the items, where the modified crawl information is related to items associated with sources; and, the crawl search system comprising a pipeline processor configured to receive the modified crawl information related to the items and to propagate the modified crawl information to the target search system, where the modified crawl information describes changes in the items gathered by the crawl search system and comprises at least one of changes to an item, metadata or security information.

2. The enterprise search system of claim 1, where the index functionally replicates a primary index of the crawl search system in a non-transitory computer-readable medium.

3. The enterprise search system of claim 2, where the index and the primary index employ different storage mechanisms.

4. The enterprise search system of claim 1, further comprising a plurality of target search systems, where the index of each target system independently functionally replicates a primary index of the crawl search system by using the modified crawl information to update the index.

5. The enterprise search system of claim 1, further comprising a plurality of target search systems, where the indexes of the target systems collectively functionally replicate a primary index of the crawl search system by using the modified crawl information to update the index; and the pipeline processor selectively forwarding the modified crawl information to a subset of the plurality of target search systems based, at least in part, on a type of the items, where a subset is less than the plurality.

6. The enterprise search system of claim 1, where the items comprise at least one of documents, files, web pages, emails spread sheets and/or databases.

7. The enterprise search system of claim 1, further comprising a crawler logic configured to re-index a modified item marked for re-indexing by the crawl search system to provide modified crawl information that describes the modifications determined from the re-indexing to the pipeline processor.

8. An enterprise search system, comprising:

a plurality of target search systems, each target search system comprising an index logic that uses modified crawl information related to items associated with sources to update an index that supports searching of the items where the modified crawl information describes changes in the items gathered by a crawl search system;

the crawl search system comprising:

a pipeline processor configured to receive modified crawl information related to the items and to propagate the modified crawl information to the plurality of target systems; and, a crawler logic configured to access the items to determine a modification to the items and selectively mark items for re-indexing if there is a modification, the crawler logic further configured to provide modified crawl information to the pipeline processor.

9. The enterprise search system of claim 8, where each of the plurality of target search systems is configured to process only a particular type of item and the pipeline processor propagates only the particular type of item to a search system associated with the particular type.

10. The enterprise search system of claim 8, where each of the plurality of target search systems is configured to process only items associated with a particular source.

11. The enterprise search system of claim 8, where each of the plurality of target search systems is configured to process only items associated with one or more entities.

12. The enterprise search system of claim 8, where the index of each target system independently functionally replicates a primary index of the crawl search system.

13. The enterprise search system of claim 8, where the indexes of the target systems collectively functionally replicate a primary index of the crawl search system.

14. A distributed enterprise crawl system, comprising:

a first search system and a second search system, each search system comprising:

an index logic that uses modified crawl information related to items associated with sources to maintain an index that supports searching of the items;

a pipeline processor configured to receive modified crawl information related to the items and to propagate the modified crawl information to the other search system; and, a crawler logic configured to access the items to determine a modification to the items, the crawler logic further configured to provide modified crawl information that describes changes in the items gathered by the crawler logic to the pipeline processor and to the index of the particular search system, where the first search system is configured to access items associated with a first source and the second search system is configured to access items associated with a second source.

15. The distributed enterprise crawl system of claim 14, where the index of each search system independently functionally replicates the index of the other search system.

16. A computer implemented method for replicating search information, comprising:

crawling items associated with sources;

identifying changes to the items;

broadcasting information regarding the identified changes to a plurality of target search systems, where each of the plurality of target search systems is configured to process only items associated with a particular source; and, independently updating, in a non-transitory computer-readable medium, an index associated with each target search system based on the broadcasted identified changes where each target search system updates the associated index using identified changes associated with a particular source.

17. The method of claim 16, where the broadcasting includes collecting the identified changes and broadcasting the identified changes to the plurality of target search systems, where the identified changes to an item are a less-than-whole portion of the item.

18. The method of claim 16, where identifying changes to the items includes re-indexing items that have been marked by the crawling.

19. The method of claim 16, where the index of each target system independently functionally replicates a primary index of a crawl search system.

20. The method of claim 16, where the indexes of the target systems collectively functionally replicate a primary index of a crawl search system.

21. A non-transitory computer-readable medium for providing processor executable instructions that when executed cause a computer to perform a method for replicating search information in a computing system comprising a plurality of search systems and a plurality of crawlers, the method comprising:

distributing crawling assignments of a plurality of information sources between the plurality of crawlers;

crawling and identifying, by each of the crawlers, changes to items from one or more assigned information sources;

broadcasting, by each of the crawlers, the identified changes to the plurality of search systems, where each of the plurality of target search systems is configured to process only items associated with a particular source; and independently updating, by each of the search systems, an index to the plurality of information sources using the identified changes broadcasted from each of the crawlers where each target search system updates an associated index using identified changes associated with a particular source that are broadcasted by the crawlers.

* * * * *

UNITED STATES PATENT AND TRADEMARK OFFICE
CERTIFICATE OF CORRECTION

| | | |
|---|---|---|
| PATENT NO. | : 7,945,533 B2 | Page 1 of 1 |
| APPLICATION NO. | : 11/710100 | |
| DATED | : May 17, 2011 | |
| INVENTOR(S) | : Krishnaprasad et al. | |

It is certified that error appears in the above-identified patent and that said Letters Patent is hereby corrected as shown below:

In column 1, line 13, delete "et at." and insert --et al.--, therefor.

In column 3, line 43, delete "servelet," and insert --servlet,--, therefor.

Signed and Sealed this

Eleventh Day of October, 2011

David J. Kappos
*Director of the United States Patent and Trademark Office*